(12) United States Patent
Magoshi et al.

(10) Patent No.: US 6,541,070 B2
(45) Date of Patent: Apr. 1, 2003

(54) METHOD OF FORMING A COMPOSITE COATING FILM COMPRISING A PIGMENT AND RESIN EMULSION

(75) Inventors: Atsuo Magoshi, Osaka (JP); Kouki Hayashi, Suita (JP); Hiroharu Ohsugi, Hirakata (JP); Teruaki Kuwajima, Shijonawate (JP)

(73) Assignee: Nippon Paint Co. Ltd., Osaka (JP)

( * ) Notice: Subject to any disclaimer, the term of this patent is extended or adjusted under 35 U.S.C. 154(b) by 83 days.

(21) Appl. No.: 09/791,848

(22) Filed: Feb. 26, 2001

(65) Prior Publication Data

US 2001/0033897 A1 Oct. 25, 2001

(30) Foreign Application Priority Data

Feb. 25, 2000 (JP) ........................................ 2000-049455

(51) Int. Cl.$^7$ .............................. B05D 1/36; B05D 3/02; B05D 7/16
(52) U.S. Cl. ................................ 427/407.1; 427/372.2; 524/556; 524/558; 524/832
(58) Field of Search ............................. 427/402, 407.1, 427/409; 524/556, 558, 832

(56) References Cited

U.S. PATENT DOCUMENTS 5,322,715 A * 6/1994 Jouck et al. ................ 427/409
5,635,564 A * 6/1997 Wieditz et al. ........... 427/407.1
5,700,862 A * 12/1997 Sho et al. .................... 524/403

FOREIGN PATENT DOCUMENTS

| JP | 63207870 A | 8/1988 |
| WO | WO 88/02381 | 4/1988 |
| WO | WO 88/02382 | 4/1988 |

* cited by examiner

Primary Examiner—Shrive P. Beck
Assistant Examiner—William Phillip Fletcher, III
(74) Attorney, Agent, or Firm—Connolly Bove Lodge & Hutz LLP

(57) ABSTRACT

The present invention provides a method of forming a composite coating film which makes it possible to attain both appearance and workability in a high-humidity environment. The method of forming a composite coating film according to the present invention comprises applying a water-based base coat composition on a substrate, and then a clear coat thereon, wherein said water-based base coat composition comprises a pigment and a resin emulsion obtained by emulsion polymerization of an α,β-ethylenically unsaturated monomer mixture, said α,β-ethylenically unsaturated monomer mixture having an acid value of 3 to 50 mg KOH/g and containing at least 65% by weight of a (meth)acrylic ester whose ester moiety contains 1 or 2 carbon atoms.

18 Claims, No Drawings

METHOD OF FORMING A COMPOSITE COATING FILM COMPRISING A PIGMENT AND RESIN EMULSION

FIELD OF THE INVENTION

The present invention relates to a method of forming a composite coating film on car bodies and so on and a composite coating film obtained by the method.

PRIOR ART

From environmental considerations, efforts have been made in recent years to develop water-based coating systems for reducing the levels of organic solvents in coatings. In automotive coating where it is common practice to apply a base coating and, then, a clear coating, attempts have been made to apply a water-based system to the base coating.

As a water-based base coat composition suited to automotive use, Japanese Kokai Publication Sho-63-193968 discloses a water-based coating composition comprising a water-dispersible film-forming acrylic emulsion polymer, a hydrophobic melamine resin and a pigment and Japanese Kokai Publication Sho-63-265974 discloses a water-based paint comprising a resin emulsion having a core component comprised of a $C_{4-12}$ alkyl-containing monomer and a shell component containing an acrylamide or methacrylic acid.

However, with any of the water-based base coat compositions heretofore available generally, inclusive of those mentioned above, it has been found difficult to attain both coat appearance and workability, particularly workability under highly humid conditions.

SUMMARY OF THE INVENTION

The object of the present invention is to provide a method of forming a composite coating film which makes it possible to attain both appearance and workability, particularly attain workability, in a high-humidity environment.

The method of forming a composite coating film according to the present invention comprises applying a water-based base coat composition on a substrate, and then applying a clear coat thereonto, wherein said water-based base coat composition comprises a pigment and a resin emulsion obtained by emulsion polymerization of an $\alpha,\beta$-ethylenically unsaturated monomer mixture, said $\alpha,\beta$-ethylenically unsaturated monomer mixture having an acid value of 3 to 50 and containing at least 65% by weight of a (meth)acrylic ester whose ester moiety contains 1 or 2 carbon atoms.

It is to be understood that the hydroxyl value of said $\alpha,\beta$-ethylenically unsaturated monomer mixture may be within the range of 10 to 150.

Furthermore, the emulsion polymerization may be carried out in two stages.

In addition, said pigment may be a luster pigment.

Furthermore, the water-based base coat composition may comprise a curing agent and/or a water-soluble acrylic resin.

The water-soluble acrylic resin may for example be obtainable by solution polymerization of a component containing not less than 65 weight % of a (meth)acrylic ester whose ester moiety contains 1 or 2 carbon atoms.

The composite coating film of the invention is obtainable by the above method of forming a composite coating film.

DETAILED DESCRIPTION OF THE INVENTION

The method of forming a composite coating film according to the invention comprises applying a water-based base coat composition to a substrate and, then applying a clear coat composition thereon, in which said water-based base coat composition comprises a pigment and a resin emulsion obtained by emulsion polymerization of an $\alpha,\beta$-ethylenically unsaturated monomer mixture, said $\alpha,\beta$-ethylenically unsaturated monomer mixture having an acid value of 3 to 50 and containing at least 65% by weight of a (meth)acrylic ester whose ester moiety contains 1 or 2 carbon atoms.

Water-Based Base Coat Composition

The water-based base coat composition for use in the method of forming a composite coating film in accordance with the invention contains a pigment and a resin emulsion obtained by emulsion polymerization of an $\alpha,\beta$-ethylenically unsaturated monomer mixture.

The amount of the (meth)acrylate ester whose ester moiety contains 1 or 2 carbon atoms as contained in the $\alpha,\beta$-ethylenically unsaturated monomer mixture is not less than 65% by weight. If the proportion is less than 65%, the coating film obtained will be poor in appearance. The (meth)acrylate ester whose ester moiety contains 1 or 2 carbon atoms includes methyl (meth)acrylate and ethyl (meth)acrylate. In the context of the present invention, "(meth)acrylic ester" includes, within the meaning thereof, both of "acrylic ester and methacrylic ester".

The $\alpha,\beta$-ethylenically unsaturated monomer mixture has an acid value of 3 to 50, preferably 7 to 40. Any acid value less than 3 will not contribute to improved workability and an acid value exceeding 50 will lead to decreased water resistance of the coating film. When, on the other hand, the water-based base coat composition is required to have curability, the $\alpha,\beta$-ethylenically unsaturated monomer mixture should have a hydroxyl value of 10 to 150, preferably 20 to 100. A hydroxyl value less than 10 will fail to provide sufficient curability while a hydroxyl value exceeding 150 will lead to decreased water resistance of the coating film. From the viewpoint of physical properties of the coating film, it is preferred that the polymer obtained by copolymerization of the above $\alpha,\beta$-ethylenically unsaturated monomer mixture have a glass transition temperature between $-20°$ C. and $80°$ C.

The $\alpha,\beta$-ethylenically unsaturated monomer mixture can have such an acid value and/or hydroxyl value as mentioned above by containing an acid group- or hydroxyl group-containing $\alpha,\beta$-ethylenically unsaturated monomer or monomers therein.

As the acid group-containing $\alpha,\beta$-ethylenically unsaturated monomer, there may be mentioned acrylic acid, methacrylic acid, acrylic acid dimer, crotonic acid, 2-acryloyloxyethyl phthalate, 2-acryloyloxyethyl succinate, $\omega$-carboxypolycaprolactone mono(meth)acrylate, isocrotonic acid, $\alpha$-hydroxy-$\omega$-((1-oxo-2-propenyl)oxy)poly(oxy(1-oxo-1,6-hexanediyl)), maleic acid, fumaric acid, itaconic acid, 3-vinylsalicylic acid, 3-vinylacetylsalicylic acid, 2-acryloyloxyethyl acid phosphate, 2-acrylamido-2-methylpropanesulfonic acid and the like. Among these, acrylic acid, methacrylic acid and acrylic acid dimer are preferred.

As the hydroxyl group-containing $\alpha,\beta$-ethylenically unsaturated monomer, there may be mentioned hydroxyethyl (meth)acrylate, hydroxypropyl (meth)acrylate, hydroxybutyl (meth)acrylate, allyl alcohol, methacryl alcohol, hydroxyethyl (meth)acrylate-$\epsilon$-caprolactone adducts and the like. Preferred among these are hydroxyethyl (meth)acrylate, hydroxybutyl (meth)acrylate, and hydroxyethyl (meth)acrylate-$\epsilon$-caprolactone adducts.

The α,β-ethylenically unsaturated monomer mixture may contain one or more other α,β-ethylenically unsaturated monomers. Such other α,β-ethylenically unsaturated monomers include (meth)acrylate esters whose ester moiety contains 3 or more carbon atoms (e.g. n-butyl (meth)acrylate, isobutyl (meth)acrylate, tert-butyl (meth)acrylate, 2-ethylhexyl (meth)acrylate, lauryl (meth)acrylate, phenyl (meth)acrylate, isobornyl (meth)acrylate, cyclohexyl (meth)acrylate, tert-butylcyclohexyl (meth)acrylate, dicyclopentadienyl (meth)acrylate, dihydrodicyclopentadienyl (meth)acrylate, etc.), polymerizable amide compounds (e.g. (meth)acrylamide, N-methylol (meth)acrylamide, N-butoxymethyl (meth)acrylamide, N,N-dimethyl(meth)acrylamide, N,N-dibutyl(meth)acrylamide, N,N-dioctyl(meth)acrylamide, N-monobutyl(meth)acrylamide, N-monooctyl(meth)acrylamide, 2,4-dihydroxy-4'-vinylbenzophenone, N-(2-hydroxyethyl)acrylamide, N-(2-hydroxyethyl)methacrylamide, etc.), polymerizable aromatic compounds (e.g. styrene, α-methylstyrene, vinyl ketones, tert-butylstyrene, p-chlorostyrene, vinylnaphthalene, etc.), polymerizable nitriles (e.g. acrylonitrile, methacrylonitrile, etc.), α-olefins (e.g. ethylene, propylene, etc.), vinyl esters (e.g. vinyl acetate, vinyl propionate, etc.), dienes (e.g. butadiene, isoprene, etc.), and so forth. One or more of these monomers may be selected according to the intended application. For assuring hydrophilicity with ease, the use of (meth)acrylamide is preferred.

The proportion of said α,β-ethylenically unsaturated monomer or monomers other than the (meth)acrylate ester whose ester moiety contains 1 or 2 carbon atoms should be less than 35% by weight in the α,β-ethylenically unsaturated monomer mixture.

The resin emulsion to be contained in the water-based base coat composition of the invention is a resin obtained by emulsion polymerization of the above α,β-ethylenically unsaturated monomer mixture. Here, the emulsion polymerization can be carried out by a method generally well known in the art. Specifically, it can be effected by dissolving an emulsifier in water or an aqueous medium containing an organic solvent such as an alcohol, as necessary, and adding dropwise the above α,β-ethylenically unsaturated monomer mixture and a polymerization initiator thereinto with heating and stirring. It is also possible to add dropwise the α,β-ethylenically unsaturated monomer mixture emulsified beforehand using an emulsifier and water in the same manner.

Suited for use as the polymerization initiator are oil-soluble azo compounds (e.g. azobisisobutyronitrile, 2,2'-azobis(2-methylbutyronitrile), 2,2'-azobis(2,4-dimethylvaleronitrile), etc.), water-soluble azo compounds (e.g. anionic 4,4'-azobis(4-cyanovaleric acid) and 2,2-azobis(N-(2-carboxyethyl)-2-methylpropionamidine) and cationic 2,2'-azobis(2-methylpropionamidine)); as well as oil-soluble redox system peroxides (e.g. benzoyl peroxide, p-chlorobenzoyl peroxide, lauroyl peroxide, tert-butyl perbenzoate, etc.) and water-soluble redox system peroxides (e.g. potassium persulfate, ammonium persulfate, etc.).

The emulsifier may be any of those commonly used in the art. Particularly preferred are, however, reactive emulsifiers such as Antox MS-60 (product of Nippon Nyukazai), Eleminol JS-2 (product of Sanyo Chemical Industries), Adeka Reasoap NE-20 (product of Asahi Denka Kogyo), Aqualon HS-10 (product of Dai-ichi Kogyo Seiyaku) and the like.

A chain transfer agent such as a mercaptan (e.g. lauryl mercaptan) and α-methylstyrene dimer may be used as necessary for controlling the molecular weight.

The reaction temperature depends on an initiator. Thus, with an azo initiator, for instance, it is 60 to 90° C. and, with a redox system, the reaction is preferably carried out at 30 to 70° C. Generally, the reaction time is 1 to 8 hours. The amount of the initiator relative to the total amount of the α,β-ethylenically unsaturated monomer mixture is generally 0.1 to 5% by weight, preferably 0.2 to 2% by weight.

The above emulsion polymerization may be carried out in a plurality of stages, for example in 2 stages. Thus, a portion of the α,β-ethylenically unsaturated monomer mixture (α,β-ethylenically unsaturated monomer mixture 1) is first subjected to emulsion polymerization and then the remaining α,β-ethylenically unsaturated monomer mixture (α,β-ethylenically unsaturated monomer mixture 2) is further reacted to conduct the emulsion polymerization.

From the standpoint of preventing the effect of imbibing on the clear coat, the α,β-ethylenically unsaturated monomer mixture 1 preferably contains an amide group-containing α,β-ethylenically unsaturated monomer. In that case, it is more preferable for the α,β-ethylenically unsaturated monomer mixture 2 to be free of any amide group-containing α,β-ethylenically unsaturated monomer. Since the α,β-ethylenically unsaturated monomer mixtures 1 and 2 combinedly constitute said α,β-ethylenically unsaturated monomer mixture, the above-mentioned requirements imposed on the α,β-ethylenically unsaturated monomer mixture are to be satisfied by the α,β-ethylenically unsaturated monomer mixtures 1 and 2 combined.

The thus-obtained resin emulsion preferably has a particle diameter within the range of 0.01 to 1.0 μm. When the particle diameter is smaller than 0.01 μm, the workability improving effect will not be appreciable. A particle diameter larger than 1.0 μm may possibly impair the appearance of the resulting coating film. The particle size can be controlled by adjusting the monomer composition and/or emulsion polymerization conditions.

The above resin emulsion may be adjusted to pH 5~10 by neutralizing with a base, as necessary, and put to use. This is because the stability of the resin is high in this pH range. The neutralization is preferably carried out before or after emulsion polymerization by adding a tertiary amine such as dimethylethanolamine and triethylamine.

The pigment for use in the water-based base coat composition to be used in the practice of the invention includes a luster pigment and a color pigment. The luster pigment is not particularly restricted in form and shape. It may be colored. Preferably, however, it has a mean particle diameter ($D_{50}$) of 2 to 50 μm and a thickness of 0.1 to 5 μm. A luster pigment having a mean diameter of 10 to 35 μm is excellent in the quality of luster, hence is more preferred. Specifically, it includes colored or uncolored metal lusters, for example metals or their alloys such as aluminum, copper, zinc, iron, nickel, tin, aluminum oxide and the like, as well as mixtures thereof. It further includes interfering mica pigments, white mica pigments, graphite pigments and the like.

As the color pigment, on the other hand, there may be mentioned, among others, organic pigments such as azo chelate pigments, water-insoluble azo pigments, condensed azo pigments, phthalocyanine pigments, indigo pigments, perinone pigments, perylene pigments, dioxane pigments, quinacridone pigments, isoindolinone pigments and metal complex pigments and inorganic pigments such as chrome yellow, yellow iron oxide, iron oxide red, carbon black and titanium dioxide.

The total pigment weight concentration (PWC) in the water-based base coat composition is preferably 0.1 to 50%, still more preferably 0.5 to 40%, most preferably 1.0 to 30%. Above the upper limit, the coating film obtained will be poor in appearance. In cases where a luster pigment is contained, it is generally preferred that the pigment weight concentration (PWC) thereof be not more than 18.0%. Above the upper limit, the coating film appearance will become poor. More preferably, that PWC is 0.01 to 15.0%, most preferably 0.01 to 13.0%.

The water-based base coat composition of the invention may contain a curing agent. The curing agent may be any of the curing agents used in coating compositions in general. As such, there may be mentioned amino resins, blocked isocyanates, epoxy compounds, aziridine compounds, carbodiimide compounds, oxazoline compounds and metal ions, among others. In consideration of coating film characteristics and production cost, amino resins and/or blocked isocyanates are generally used.

The amino resin as a curing agent is not particularly restricted but may be a water-soluble melamine resin or a water-insoluble melamine resin. From the viewpoint of the stability, a melamine resin having a water tolerance of not less than 3.0 is preferably used among melamine resins. The "water tolerance" is a parameter used to evaluate the degree of hydrophilicity and a higher value of this parameter means a higher level of hydrophilicity. The value of water tolerance is determined by dispersing 0.5 g of a sample into 10 ml of acetone in a 100-ml beaker at 25° C., adding deionized water gradually to this dispersion using a biuret and determining the amount (ml) of deionized water required to cause the mixture to become turbid. This amount (ml) of deionized water is referred to as the water tolerance value.

As the blocked isocyanate, there may be mentioned those products obtained by adding an active hydrogen-containing blocking agent to a polyisocyanate such as trimethylene diisocyanate, hexamethylene diisocyanate, xylylene diisocyanate and isophorone diisocyanate and capable of regenerating isocyanato groups upon dissociation of the blocking agent.

When such a curing agent is incorporated, its content is preferably 20 to 100 parts by weight per 100 parts by weight of the resin solid in the water-based base coat composition. Outside the above range, insufficient curability will result.

The water-based base coat composition of the invention may contain one or more other coating film-forming resins as necessary. Such resins are not particularly restricted but use may be made of acrylic resins, polyester resins, alkyd resins, epoxy resins, urethane resins and other coating film-forming resins.

The number average molecular weight range of said other coating film-forming resin or resins is 3,000 to 50,000, preferably 6,000 to 30,000. When the molecular weight is less than 3,000, coating workability is poor and curability is insufficient and when the molecular weight exceeds 50,000, the nonvolatile fraction is so low as to decrease the workability.

The other coating film-forming resin or resins preferably have an acid value of 10 to 100 mg KOH/g, more preferably 20 to 80 mg KOH/g. Above the upper limit, the water resistance of the coating film will decrease. Below the lower limit, the dispersibility of the resin in water will be decreased. Further, the resins preferably have hydroxyl values within the range of 20 to 180 mg KOH/g, more preferably 30 to 160 mg KOH/g. Above the upper limit, the water resistance of the coating film will be decreased while, below the lower limit, the curability of coating will be decreased.

The proportions of the resin emulsion and other coating film-forming resin in the water-based base coat composition are such that the resin emulsion accounts for 5 to 95% by weight, preferably 10 to 85% by weight, more preferably 20 to 70% by weight, and the other coating film-forming resin or resins account for 95 to 5% by weight, preferably 90 to 15% by weight, more preferably 80 to 30% by weight, based on the total resin solids. When the resin emulsion accounts for less than 5% by weight, workability tends to be adversely affected. When its proportion exceeds 95% by weight, the coating film-forming properties tend to become poor.

From the standpoint of compatibility with the resin emulsion, said other coating film-forming resin is preferably a water-soluble acrylic resin. The water-soluble acrylic resin can be obtained by solution-polymerizing an α,β-ethylenically unsaturated monomer having an acidic group as defined for said α,β-ethylenically unsaturated monomer mixture as an essential component together with one or more other α,β-ethylenically unsaturated monomers. From the standpoint of coating film appearance, it is preferable that the material to be used for said water-soluble acrylic resin contain not less than 65 weight % of a (meth)acrylic ester whose ester moiety contains 1 or 2 carbon atoms.

The water-soluble acrylic resin mentioned above is usually neutralized with a basic compound, for example an organic amine such as monomethylamine, dimethylamine, trimethylamine, triethylamine, diisopropylamine, monoethanolamine, diethanolamine and dimethylethanolamine and dissolved in water before use. The neutralization procedure may be applied to the very water-soluble acrylic resin or carried out in the stage of preparation of the water-based base coat composition to be described hereinafter.

The water-based base coat composition mentioned above may contain a polyether polyol. Incorporation of a polyether polyol contributes to the flip-flop properties of the composite coating film and, hence, improves the appearance of the coating film.

The polyether polyol mentioned above is preferably a compound containing at least one primary hydroxyl group per molecule and having a number average molecular weight of 300 to 3000, a hydroxyl value of 30 to 700, and a water tolerance value, defined above, of not less than 2.0. If the above requirements are not satisfied, the water resistance tends to be low and/or the expected improvement in appearance may not be obtained.

As such a polyether polyol, there can be used the adduct of an alkylene oxide, such as ethylene oxide and propylene oxide, to an active hydrogen-containing compound such as a polyhydric alcohol, a polyphenol compound and a polycarboxylic acid. As specific examples, such commercial products as Primepol PX-1000, Sannix SP-750 (both available from Sanyo Chemical Industries) and PTMG-650 (Mitsubishi Chemical), among others, can be mentioned. The amount of use of the polyether polyol in the coating is preferably 1 to 40 weight %, more preferably 3 to 30 weight %, on a solid matter basis.

The water-based base coat composition may contain an additional viscosity modifier to prevent imbibing with the top coat coating film and/or secure good workability in application. The viscosity modifier may be any of those generally showing thixotropic properties. As the viscosity modifier, there may be mentioned, for example, crosslinked or noncrosslinked resin particles, swollen dispersions of fatty acid amide, amide type fatty acids, polyamides such as long-chain polyaminoamide phosphates, polyethylene type ones such as colloidal swollen dispersions of oxidized polyethylene, organic acid smectite clays, montmorillonite and like organic bentonite type ones, inorganic pigments such as aluminum silicate and barium sulfate, and flat pigments capable of generating viscosity owing to the shape thereof.

The water-based base coat coating of the invention may contain, in addition to the above components, one or more of those additives generally used in coating compositions, such as surface modifiers, thickening agents, antioxidants, ultraviolet absorbers, antifoams, and so on. The addition amount of these are within the ranges respectively well known in the art.

The method of preparing the coating composition in the practice of the invention is not particularly restricted but may be any of all the methods known in the art, inclusive of those to be described later herein, for example the method comprising dispersing and kneading the pigment and other components using a kneader or roll mill.

Clear Coat Composition

The clear coat composition is not particularly restricted but may be any of clear coatings containing a coating film-forming resin, a curing agent and the like. It may contain a color pigment in an amount which will not impair the design of the undercoat. This clear coating may have a solvent-based or water-based form or a powder form.

As preferred examples of the solvent-based clear coating, there may be mentioned, from the viewpoint of transparency or acid etching resistance, for instance, combinations of an acrylic resin and/or polyester resin and an amino resin and/or isocyanate, or acrylic resins and/or polyester resins having a carboxylic acid-epoxy curing system.

As examples of the water-based clear coating, there may be mentioned a composition containing the coating film-forming resin mentioned hereinabove for formulation in the solvent-based clear coatings as rendered water-based type in advance by neutralization with a base. This neutralization can be carried out before or after polymerization by adding a tertiary amine such as dimethylethanolamine and triethylamine.

As for the powder-form clear coating, ordinary powder coatings such as thermoplastic or thermosetting powder coatings can be used. Thermosetting powder coatings are preferred, however, since they give coating films having good physical properties. Specific examples of the thermosetting powder coating are epoxy, acrylic and polyester type powder clear coatings, among which acrylic powder clear coatings capable of providing good weathering resistance are particularly preferred.

Further, to the above clear coating, there is preferably added a viscosity modifier to thereby secure good workability in application. The viscosity modifier may be any of those generally showing thixotropic properties. Usable as such are those mentioned hereinabove referring to the water-based base coat composition. The composition may contain a curing agent, a surface modifier and/or the like, where necessary.

Substrate

The method of forming a coating film according to the invention can advantageously be applied to various substrates such as metals, plastics and foamed bodies and, in particular, to metal surfaces and castings. It can most judiciously be applied to metal products coatable by cationic electrodeposition coating.

As the metal products, there may be mentioned products made of iron, copper, aluminum, tin, zinc and the like as well as alloys containing these metals. Specifically, mention may be made of bodies and parts of cars, trucks, motorcycles, buses and the like. Most preferably, these metals are subjected in advance to chemical conversion treatment with a phosphate or chromate salt or the like.

An electrodeposition coating film may be formed on such a chemically converted steel panel surface and, in that case, the electrodeposition coating may be a cationic or anionic type coating. A cationic electrodeposition coating is preferred, however, since it gives a composite coating film superior in corrosion resistance.

As the plastics products, there may be mentioned products made of polypropylene resins, polycarbonate resins, urethane resins, polyester resins, polystyrene resins, ABS resins, vinyl chloride resins, polyamide resins and the like. Specifically, there may be mentioned spoilers, bumpers, mirror covers, grilles, door knobs and other automotive parts, among others. These plastics products are preferably washed by vapor cleaning using trichloroethane or washed with a neutral detergent. Further, they may be coated with a primer for enabling electrostatic coating.

When necessary, an intermediate coating film may be formed on the substrate. For forming such an intermediate coating film, an intermediate coating is used. The intermediate coating contains a coating film-forming resin, a curing agent, one or more of various organic or inorganic color pigments and extender pigments, and so forth.

The coating film-forming resin to be used in said intermediate coating is not particularly restricted but may be any of such coating film-forming resins as acrylic resins, polyester resins, alkyd resins, epoxy resins and urethane resins. These resins are used in combination with the curing agent described hereinbefore with reference to the water-based base coat composition. From the standpoint of film properties and cost, an amino resin and/or an isocyanate compound are/is generally employed.

As the color pigment to be contained in the intermediate coating, those pigments mentioned hereinabove referring to the water-based base coat composition can be used in the same manner. Normally, a gray intermediate coating in which carbon black and titanium dioxide are used as main pigments, a set gray composition matched in hue to the topcoat, or the so-called color intermediate coating in which various color pigments are used combinedly is preferred. Further, a flat pigment such as an aluminum or mica powder may be added.

In these intermediate coatings, there may be incorporated, in addition to the components mentioned above, one or more of those additives which are generally used in coating compositions, such as surface modifiers, antioxidants, antifoams, and so on.

Method of Forming a Composite Coating Film

According to the method of the invention for forming a composite coating film, a base coat and a clear coat can be formed, using the water-based base coat composition and the clear coat composition, respectively, in that order on a substrate, with an electrodeposited coating film and an intermediate coating film formed thereon as necessary.

In applying the water-based base coat composition according to the invention to car bodies, coating films can be formed by multistage coating, preferably two-stage coating, using the electrostatic air spray coating technique or by the coating method combinedly using an electrostatic air spray coater and a rotary atomizer type electrostatic coater commonly known as "μμ (micromicro) bell", "μ (micro) bell" or "metallic bell", for instance.

The coating film thickness to be attained in applying the water-based base coat composition in the practice of the invention may vary according to the intended application but a thickness of 10 to 30 μm is useful in many instances. Above the upper limit, the image sharpness may decrease or troubles such as unevenness or runs may occur in the step of application. Below the lower limit, the substrate cannot be masked effectively.

While, in carrying out the method of forming a composite coating film according to the invention, it is also possible to apply a clear coat composition to the above base coat film after baking thereof, it is preferable from the economic and environmental viewpoint to apply the clear coat composition onto the uncured base coat to thereby form a clear coat, since, by doing so, a drying for baking can be omitted. For obtaining good finished coating films, it is desirable that the uncured base coat is heated at 40 to 100° C. for 2 to 10 minutes prior to application of the clear coat composition.

In practicing the method of forming a coating film according to the invention, the clear coat applied after formation of the base coat is formed for the purpose of smoothing out the unevenness, twinklings and like effects caused by the base coat and protecting the same. As for the specific method of application, it is preferable to form a coat by using a rotary atomizer type electrostatic coater such as the μμ bell or μ bell mentioned above.

As for the dry film thickness of the clear coat film formed by the clear coat composition, a thickness of about 10 to 80 μm is generally preferred and a thickness of about 20 to 60 μm is more preferred. Above the upper limit, troubles such as foaming or sagging may occur in the step of coating. Below the lower limit, the unevenness of the substrate cannot be masked.

Formation of the clear coat to be obtained in the above manner is preferably carried out by the so-called two-coat one-bake method, as mentioned above, namely followed by baking the same together with the uncured base coat. The baking temperature is selected from the range of 80 to 180° C., preferably 120 to 160° C., whereby a cured film with a high crosslinking density can be obtained. Above the upper limit, the coat may become hard and brittle and, below the lower limit, a sufficient level of hardness cannot be obtained. The curing time may vary depending on the curing temperature but, at 120° C. to 160° C., a time of 10 to 30 minutes is adequate.

The composite coating film formed according to the invention have, in many instances, a thickness of 30 to 300 μm, preferably 50 to 250 μm. Above the upper limit, the physical properties, such as thermal shock resistance, of the film is decreased while, below the lower limit, the strength of the coating film itself is sacrificed.

The method of forming a composite coating film according to the present invention in which a resin emulsion obtained from an α,β-ethylenically unsaturated monomer mixture of a defined formulation is used in the water-based base coat composition, it is possible to attain both good appearance and high coating workability at the same time. This is probably because the use of a high-SP neutral monomer in an amount not less than a given level results in an increased hydrophilicity of the resin without compromise in water resistance and other qualities, thus contributing to compatibility of the resin with water and, hence, an improved appearance of the coating film. On the other hand, because the resin has an acid value, the resin swells owing to the basic component present in the water-based coating so that a viscosity suited to an efficient coating workability is obtained. Thus, the method of forming a composite coating film insures good workability even under high-humidity coating conditions. In addition, a further improvement in film appearance can be obtained by incorporating a polyether polyol in the water-based base coat composition.

EXAMPLES

The following specific examples illustrate the present invention in detail. They are, however, by no means limitative of the scope of the invention. In the following, "part(s)" means "part(s) by weight".

Production Example 1

Production of Resin Emulsion A

A reactor was charged with 126 parts of deionized water, and the temperature was raised to 80° C. under stirring in a nitrogen atmosphere. Then, a monomer emulsion composed of 100 parts of the α,β-ethylenically unsaturated monomer mixture defined below (acid value: 20; hydroxyl value: 40), 0.5 part of Aqualon HS-10 (polyoxyethylene alkylpropenylphenyl ether sulfate ester, product of Daiichi Kogyo Seiyaku), 0.5 part of Adeka Reasoap NE-20 (α-[1-[(allyloxy)methyl]-2-(nonylphenoxy)ethyl]-ω-hydroxyoxyethylene, product of Asahi Denka Kogyo) and 100 parts of deionized water and an initiator solution composed of 0.3 part of ammonium persulfate and 10 parts of deionized water were added dropwise in parallel to the reaction vessel over 2 hours. After completion of the dropwise addition, maturation (a ripening reaction) was effected at the same temperature for 2 hours.

Then, after cooling to 40° C., the reaction mixture was filtered through a 400-mesh filter, and then adjusted to pH 6.5 by adding 67.1 parts of deionized water and 0.32 part of dimethylaminoethanol to give a resin emulsion A with a mean particle diameter of 250 nm and a nonvolatile fraction of 25%.

| α,β-Ethylenically unsaturated monomer mixture | |
|---|---|
| Methyl methacrylate | 10.22 parts |
| Ethyl acrylate | 73.43 parts |
| 2-Hydroxyethyl methacrylate | 9.28 parts |
| Acrylamide | 4.00 parts |
| Methacrylic acid | 3.07 parts |

Production Example 2

Production of Resin Emulsion B

A reactor was charged with 136 parts of deionized water and heated to 80° C. Then, under nitrogen with stirring, a monomer emulsion composed of 80 parts of the α,β-ethylenically unsaturated monomer mixture 1 described below, 0.5 part of Aqualon HS-10, 0.5 part of Adeka Reasoap NE-20 and 80 parts of deionized water and an initiator solution composed of 0.24 part of ammonium persulfate and 10 parts of deionized water were added in parallel dropwise over 2 hours. After completion of dropwise addition, a ripening reaction was conducted at the same temperature for 1 hour.

Then, 20 parts of the α,β-ethylenically unsaturated monomer mixture 2 described below (the acid and hydroxyl values of α,β-ethylenically unsaturated monomer mixtures 1 and 2 combined=20 and 40, respectively) and an initiator solution composed of 0.06 part of ammonium persulfate and 10 parts of deionized water were added in parallel dropwise at 80° C. over 0.5 hour. After completion of dropwise addition, a ripening reaction was carried out at the same temperature for 2 hours.

After cooling to 40° C., the reaction mixture was filtered through a 400-mesh filter and the filtrate was adjusted to pH 6.5 by adding 67.1 parts of deionized water and 0.32 part of dimethylaminoethanol, whereby the objective resin emulsion B having a mean particle diameter of 200 nm and a nonvolatile fraction of 25% was obtained.

| α,β-Ethylenically unsaturated monomer mixture 1 | |
|---|---|
| Methyl methacrylate | 10.22 parts |
| Ethyl acrylate | 58.36 parts |
| 2-Hydroxyethyl methacrylate | 7.42 parts |
| Acrylamide | 4.00 parts |

| α,β-Ethylenically unsaturated monomer mixture 2 | |
|---|---|
| Ethyl acrylate | 15.07 parts |
| 2-Hydroxyethyl methacrylate | 1.86 parts |
| Methacrylic acid | 3.07 parts |

Production Example 3

Production of Resin Emulsion C

Except that the following α,β-ethylenically unsaturated monomer mixture 1 was used (the acid and hydroxyl values of α,β-ethylenically unsaturated monomer mixtures 1 and 2 combined=20 and 40, respectively), the procedure of Production Example 2 was otherwise faithfully followed to give the objective resin emulsion C having a mean particle diameter of 280 nm and a nonvolatile fraction of 25%.

| α,β-Ethylenically unsaturated monomer mixture 1 | |
|---|---|
| Methyl methacrylate | 5.35 parts |
| Ethyl acrylate | 58.23 parts |
| 2-Hydroxyethyl methacrylate | 7.42 parts |
| Styrene | 5.00 parts |
| Acrylamide | 4.00 parts |

Production Example 4

Production of Resin Emulsion D

A reactor was charged with 126.5 parts of deionized water and heated to 80° C. under nitrogen with stirring. Then, a monomer emulsion composed of 80 parts of the α,β-ethylenically unsaturated monomer mixture 1 described below, 0.5 part of Aqualon HS-10, 0.5 part of Adeka Reasoap NE-20 and 80 parts of deionized water and an initiator solution composed of 0.24 part of ammonium persulfate and 10 parts of deionized water were added in parallel dropwise over 2 hours. After completion of dropwise addition, a ripening reaction was conducted at the same temperature for 1 hour.

Then, 20 parts of the α,β-ethylenically unsaturated monomer mixture 2 described below (the acid and hydroxyl values of α,β-ethylenically unsaturated monomer mixtures 1 and 2 combined=20 and 40, respectively) and an initiator solution composed of 0.06 part of ammonium persulfate and 10 parts of deionized water were added in parallel dropwise at 80° C. over 0.5 hour. After completion of dropwise addition, a ripening reaction was carried out at the same temperature for 2 hours.

After cooling to 40° C., the reaction mixture was filtered through a 400-mesh filter and the filtrate was adjusted to pH 6.5 by adding 67.1 parts of deionized water and 0.32 part of dimethylaminoethanol, whereby the objective resin emulsion D having a mean particle diameter of 200 nm and a nonvolatile fraction of 25% was obtained.

| α,β-Ethylenically unsaturated monomer mixture 1 | |
|---|---|
| Methyl acrylate | 30.61 parts |
| Ethyl acrylate | 37.97 parts |
| 2-Hydroxyethyl methacrylate | 7.42 parts |
| Acrylamide | 4.00 parts |

| α,β-Ethylenically unsaturated monomer mixture 2 | |
|---|---|
| Ethyl acrylate | 15.07 parts |
| 2-Hydroxyethyl methacrylate | 1.86 parts |
| Methacrylic acid | 3.07 parts |

Production Example 5

Production of Resin Emulsion E

Except that the following monomer composition was used as α,β-ethylenically unsaturated monomer mixture 1 (the acid and hydroxyl values of α,β-ethylenically unsaturated monomer mixtures 1 and 2 combined=20 and 40, respectively), the procedure of Production Example 2 was repeated to give the objective resin emulsion E having a mean particle diameter of 150 nm and a nonvolatile fraction of 25%.

| α,β-Ethylenically unsaturated monomer mixture 1 | |
|---|---|
| Methyl methacrylate | 8.22 parts |
| Ethyl acrylate | 54.36 parts |
| 2-Hydroxyethyl methacrylate | 7.42 parts |
| N-butoxymethylacrylamide | 10.00 parts |

Production Example 6

Production of Resin Emulsion F

Except that the following monomer mixtures according to the example given in Japanese Kokai Publication Sho-63-193968 were used as α,β-ethylenically unsaturated monomer mixtures 1 and 2 (the acid and hydroxyl values of the α,β-ethylenically unsaturated monomer mixtures 1 and 2 combined=26 and 24, respectively), the procedure of Production Example 2 was otherwise faithfully followed to give the objective resin emulsion F with a mean particle diameter of 180 nm and a nonvolatile fraction of 25%.

| α,β-Ethylenically unsaturated monomer mixture 1 | |
| --- | --- |
| Methyl methacrylate | 55.0 parts |
| Styrene | 10.0 parts |
| N-butyl acrylate | 9.0 parts |
| 2-Hydroxyethyl acrylate | 5.0 parts |
| Methacrylic acid | 1.0 parts |

| α,β-Ethylenically unsaturated monomer mixture 2 | |
| --- | --- |
| Methyl methacrylate | 5.0 parts |
| N-butyl acrylate | 7.0 parts |
| 2-ethylhexyl acrylate | 5.0 parts |
| Methacrylic acid | 3.0 parts |

Production Example 7

Production of Resin Emulsion G

Except that the following monomer mixtures according to the example given in Japanese Kokai Publication Sho-63-265974 were used as α,β-ethylenically unsaturated monomer mixtures 1 and 2 (the acid and hydroxyl values of α,β-ethylenically unsaturated monomer mixtures 1 and 2 combined=0 and 35, respectively), the procedure of Production Example 2 was otherwise faithly followed to give the objective resin emulsion G with a mean particle diameter of 130 nm and a nonvolatile fraction of 25%.

| α,β-Ethylenically unsaturated monomer mixture 1 | |
| --- | --- |
| N-butyl methacrylate | 45.0 parts |
| Methyl methacrylate | 6.5 parts |
| N-butyl acrylate | 29.0 parts |
| 2-Hydroxypropyl acrylate | 4.5 parts |

| α,β-Ethylenically unsaturated monomer mixture 2 | |
| --- | --- |
| Methyl methacrylate | 2.5 parts |
| N-butyl acrylate | 5.5 parts |
| 2-Hydroxypropyl methacrylate | 4.5 parts |

Production Example 8

Production of a Water-Soluble Acrylic Resin

A reactor was charged with 23.89 parts of tripropylene glycol methyl ether and 16.11 parts of propylene glycol methyl ether and while the mixture was stirred in a nitrogen stream, the temperature was increased to 105° C. Then, 100 parts of the monomer mixture described below and an initiator solution composed of 10.0 parts of tripropylene glycol methyl ether and 1 part of tert-butyl peroxy-2-ethylhexanoate were added in parallel dropwise over 3 hours. After completion of dropwise addition, a ripening reaction was conducted at the same temperature for 0.5 hour.

Then, an initiator solution composed of 5.0 parts of tripropylene glycol methyl ether and 0.3 part of tert-butyl peroxy-2-ethylhexanoate was added dropwise over 0.5 hour. After completion of dropwise addition, a ripening reaction was conducted at the same temperature for 2 hours.

Using a solvent evaporator, 16.1 parts of the solvent was distilled off under reduced pressure (70 Torr) at 110° C. Then, 204 parts of deionized water and 7.1 parts of dimethylaminoethanol were added to the residue to give an aqueous acrylic resin solution. This water-soluble acrylic resin had a nonvolatile fraction of 30%; the acid value and hydroxyl value of the resin solid were 40 and 50, respectively, and the viscosity was 140 poises (E-viscometer, 1 rpm/25° C.)

| Monomer mixture | |
| --- | --- |
| Methyl methacrylate | 13.1 parts |
| Ethyl acrylate | 68.4 parts |
| 2-Hydroxyethyl methacrylate | 11.6 parts |
| Methacrylic acid | 6.9 parts |

Example 1

Production of a Water-Based Metallic Base Coat Composition

A water-based metallic base coat composition was prepared by mixing and evenly dispersing 220 parts of the resin emulsion A prepared in Production Example 1, 55 parts of deionized water, 1 part of dimethylaminoethanol, 20 parts of the curing agent Cymel 204 (Mitsui Cytec, mixed alkyl-melamine resin, water tolerance 3.6 ml), 20.9 parts of the luster pigment Alpaste MH8801 (Asahi Chemical Industry; aluminum pigment), and 4.5 parts of Surfinol 440 (Air Products, surface conditioner).

Method of Forming a Composite Coating Film

Zinc phosphate-treated dull steel panels, 0.8 mm thick, 30 cm long and 40 cm wide, which had been coated with a cationic electrodeposition coating ("Powertop U-50", product of Nippon Paint) in a dry film thickness of 20 µm by electrodeposition, followed by 30 minutes of baking at 160° C., were coated with a gray intermediate coating ("Orga P-2", polyester-melamine base coating, product of Nippon Paint) diluted beforehand to a viscosity of 25 seconds (as determined at 20° C. using a No. 4 Ford cup) so as to attain a dry film thickness of 35 µm in two stages using an air spray gun, and baking was effected at 140° C. for 30 minutes.

After cooling, the water-based metallic coat composition produced in the above Example 1 was diluted with deionized water to a viscosity of 30 seconds (measured at 20° C. using a No. 4 Ford cup). The dilution was applied in two stages so as to attain a dry film thickness of 20 µm at 25° C. and a humidity of 85% using a model "µµ Bell COPES-IV" coater for water-base coatings (product of ABB Industries). One minute of interval setting was effected between the two coating operations. After the second coating operation, a setting time of 5 minutes was provided. Then, preheating was performed at 80° C. for 5 minutes.

After preheating, each coated panel was allowed to cool to room temperature and "Orga TO-563 Clear" (acrylic-melamine base clear coating, product of Nippon Paint) was applied, as a clear coat composition, in one stage so as to attain a dry film thickness of 40 µm, followed by 7 minutes of setting. The coated panels were then baked at 140° C. for 30 minutes using a dryer. In this manner, the desired composite coating film could be obtained.

Coating Workability and Film Appearance Evaluation

Coating workability

The sagging and foaming tendency of the water-based metallic base coat composition during application was evaluated according to the following criteria.

O: no sagging or foaming
Δ: sagging or foaming
X: sagging and foaming

Coating film Appearance

The image sharpness of the coating film obtained was measured with the portable image sharpness-gloss meter PGD-IV (Tokyo Photoelectric). The reading of 0.8 indicates a satisfactory appearance and any reading in excess of the above value indicates a more satisfactory appearance.

Examples 2 to 6 and Comparative Examples 1 and 2

Except that the resin emulsions indicated in Table 1 were respectively used in lieu of resin emulsion A and that a water-soluble acrylic resin was added in Examples 2~5 and the water-soluble acrylic resin and a polyether polyol were added in Example 6, the procedure of Example 1 was repeated to prepare water-based metallic base coat compositions and composite films. Using each of them, coating workability or coating film appearance was evaluated as above. The results are shown in Table 1. As the water-soluble acrylic resin, the resin prepared in Production Example 8 was used in an amount of 33.3 parts in each case, and as the polyether polyol, Primepol PX-1000 (Sanyo Chemical Industries; bifunctional polyether polyol, number average molecular weight 400, hydroxyl value 278, primary/secondary hydroxy ratio=63/37, water tolerance infinite) was used in an amount of 10 parts.

TABLE 1

|  | Example | | | | | | Compar. Ex. | |
| --- | --- | --- | --- | --- | --- | --- | --- | --- |
|  | 1 | 2 | 3 | 4 | 5 | 6 | 1 | 2 |
| Resin emulsion | A | B | C | D | E | B | F | G |
| Water-soluble acrylic resin | NO | YES | YES | YES | YES | YES | NO | NO |
| Polyether polyol | NO | NO | NO | NO | NO | YES | NO | NO |
| Workability | O | O | O | O | O | O | O | X |
| Appearance | 0.8 | 1.0 | 1.0 | 1.0 | 1.0 | 1.2 | 0.6 | 0.6 |

The coating compositions and coating films obtained according to the method of forming a composite coating film according to the invention were invariably superior in workability and appearance quality. Particularly an outstanding appearance quality was obtained in Example 6 where the composition contained a polyether polyol.

In contrast, the coating compositions and coating films obtained in Comparative Examples in which the resin emulsions according to the formulations described in working examples of the prior art were used were inferior in appearance and workability, respectively, because, in those compositions, the α,β-ethylenically unsaturated monomer mixture having no acid value and containing a (meth)acrylic ester whose ester moiety has 1 or 2 carbon atoms in a proportion of only less than 65 weight % was used.

What is claimed is:

1. A method of forming a composite coating film comprising applying a water-based base coat composition to a substrate and then applying a clear coat composition thereunto, and baking at 120 to 160° C., wherein said water-based base coat composition comprises a pigment and a resin emulsion obtained by emulsion polymerization of an α,β-ethylenically unsaturated monomer mixture, said α,β-ethylenically unsaturated monomer mixture having an acid value of 3 to 50 mg KOH/g and a hydroxyl value of 10 to 150 mg KOH/g and containing at least 65% by weight of a (meth)acrylic ester whose ester moiety contains 1 or 2 carbon atoms.

2. The method of forming a composite coating film according to claim 1 wherein said emulsion polymerization is carried out in 2 stages.

3. The method of forming a composite coating film according to claim 1 wherein said pigment is a luster pigment.

4. The method of forming a composite coating film according to claim 1 wherein said water-based base coat composition comprises a curing agent.

5. The method of forming a composite coating film according to claim 1 wherein said water-based base coat composition comprises a water-soluble acrylic resin.

6. The method of forming a composite coating film according to claim 5 wherein said water-soluble acrylic resin is obtainable by solution polymerization of a component containing not less than 65 weight % of a (meth)acrylic ester whose ester moiety contains 1 or 2 carbon atoms.

7. The method of forming a composite coating film according to claim 2 wherein said pigment is a luster pigment.

8. The method of forming a composite coating film according to claim 2 wherein said water-based base coat composition comprises a curing agent.

9. The method of forming a composite coating film according to claim 3 wherein said water-based base coat composition comprises a curing agent.

10. The method of forming a composite coating film according to claim 2 wherein said water-based base coating composition comprises a water-soluble acrylic resin.

11. The method of forming a composite coating film according to claim 3 wherein said water-based base coating composition comprises a water-soluble acrylic resin.

12. The method of forming a composite coating film according to claim 4 wherein said water-based base coating composition comprises a water-soluble acrylic resin.

13. The method of forming a composite coating film according to claim 10 wherein said water-soluble acrylic resin is obtainable by solution polymerization of a component containing not less than 65 weight % of a (meth) acrylic ester whose ester moiety contains 1 or 2 carbon atoms.

14. The method of forming a composite coating film according to claim 1, wherein an uncured base coat formed by the water-based base coat composition and an uncured clear coat formed by the clear coat composition are baked together at the same time.

15. The method of forming a composite coating film according to claim 1, wherein a particle diameter of the resin emulsion is 0.01 to 1.0 μm.

16. The method of forming a composite coating film according to claim 1, wherein the water-based base coat composition further contains a polyester polyol.

17. The method of forming a composite coating film according to claim 1, wherein the acid value of the α,β-ethylenically unsaturated monomer mixture is 7 to 40 mgKOH/g.

18. The method of forming a composite coating film according to claim 1, wherein the hydroxyl value of the α,β-ethylenically unsaturated monomer mixture is 20 to 100 mg KOH/g.

* * * * *

UNITED STATES PATENT AND TRADEMARK OFFICE
CERTIFICATE OF CORRECTION

PATENT NO.    : 6,541,070 B2
DATED         : April 1, 2003
INVENTOR(S)   : Atsuo Magoshi et al.

It is certified that error appears in the above-identified patent and that said Letters Patent is hereby corrected as shown below:

Column 16,
Lines 47, 50 and 53, replace the word "coating" with the word -- coat --.

Column 17,
Line 3, replace the word "polyester" with the word -- polyether --.

Signed and Sealed this

First Day of July, 2003

JAMES E. ROGAN
*Director of the United States Patent and Trademark Office*